United States Patent [19]
Bricaud et al.

[11] Patent Number: 5,882,230
[45] Date of Patent: Mar. 16, 1999

[54] CARD CONNECTOR WITH STABILE CONTACTS

[75] Inventors: Herve'Guy Bricaud; Fabrice Valcher, both of Dole, France

[73] Assignee: ITT Composants et Instruments, Bagneux, France

[21] Appl. No.: 763,330

[22] Filed: Dec. 10, 1996

Related U.S. Application Data

[63] Continuation-in-part of PCT/FR96/00589 Apr. 18, 1996 published as WO96/33527 Oct. 24, 1996,

[30] Foreign Application Priority Data

Apr. 21, 1995 [FR] France ................................ 95 04783

[51] Int. Cl.$^6$ .................................................. H01R 13/44
[52] U.S. Cl. ........................................ 439/630; 439/733.1
[58] Field of Search ............................. 439/630, 60, 751, 439/733.1

[56] References Cited

U.S. PATENT DOCUMENTS

| | | | |
|---|---|---|---|
| 2,099,555 | 11/1937 | Benander | 439/692 |
| 3,444,504 | 5/1969 | Lynch et al. | 439/733.1 |
| 5,249,988 | 10/1993 | Lu | 439/751 |
| 5,259,793 | 11/1993 | Yamada et al. | 439/751 |
| 5,320,552 | 6/1994 | Reichardt et al. | 439/630 |

FOREIGN PATENT DOCUMENTS

95/8421  7/1995  WIPO .

*Primary Examiner*—Neil Abrams
*Assistant Examiner*—Tho D. Ta
*Attorney, Agent, or Firm*—Freilich Hornbaker Rosen

[57] ABSTRACT

A card connector has a dielectric support (12) and card-engaging contacts (14), wherein the contacts can be easily mounted on the support and are stably held in position thereon. Each strip-shaped contact has a contacting front end portion (44) that projects above the top face of the support, a central portion (42) that extends longitudinally rearward from the front portion and which is securely mounted on the support, and a rear end (46) for connecting to a circuit board. The central portion has a rear part with a strip-shaped middle section (124) extending in a longitudinal direction, and first and second feet (52, 58) lying on laterally opposite sides of the middle section. The support has a longitudinally extending groove (28) that receives the contact central portion, and has foot-holding slots (32, 34) on laterally opposite sides of the groove. Each slot has top and bottom slot walls (36, 40) that engage a corresponding one of the feet, to fix the location of the rear part of the central portion, and to prevent pivoting of the rear part about a longitudinal axis.

5 Claims, 4 Drawing Sheets

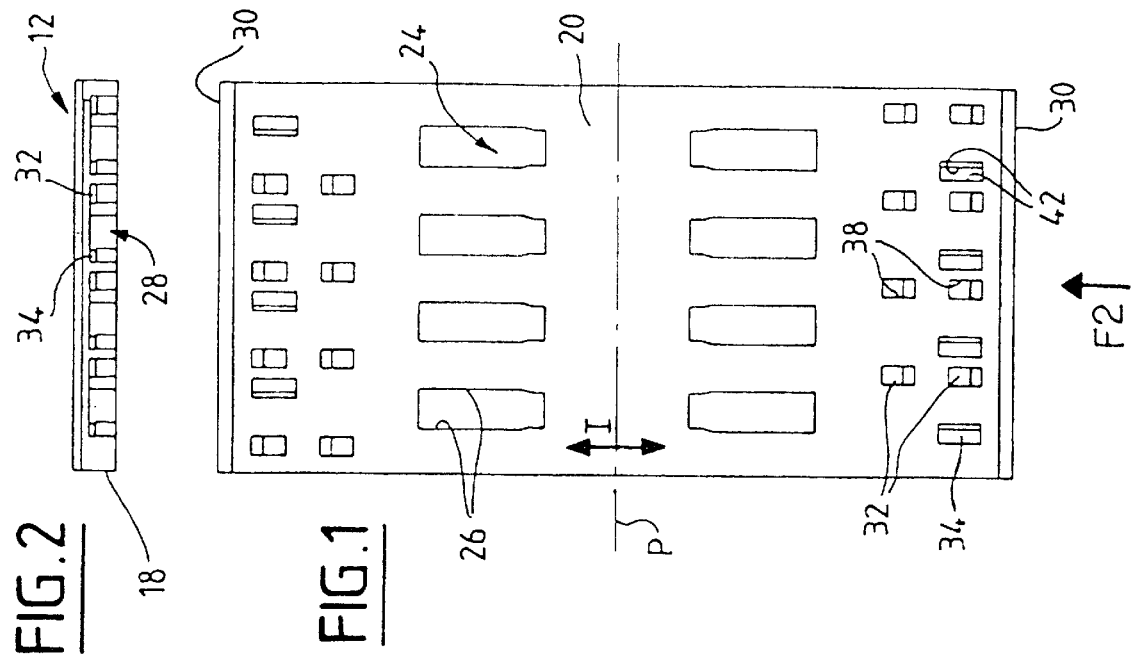
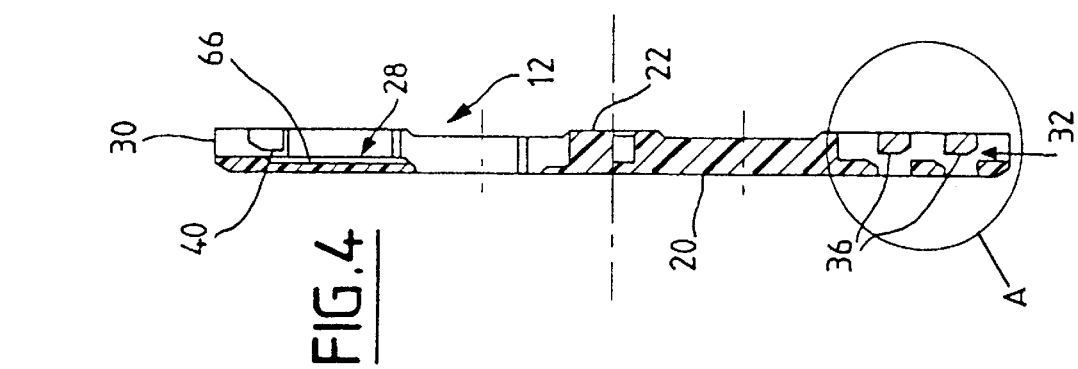
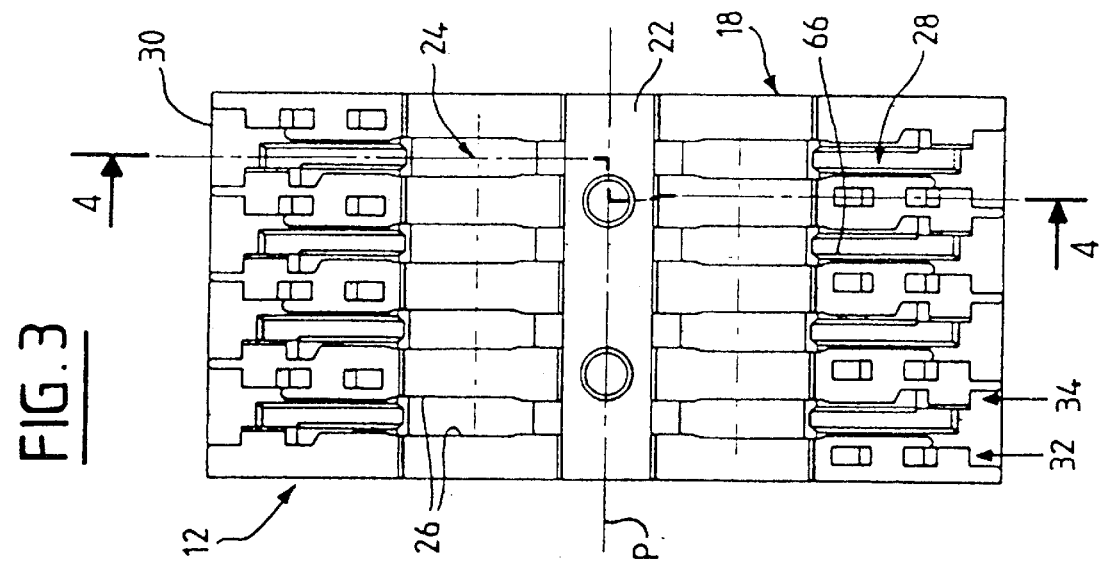

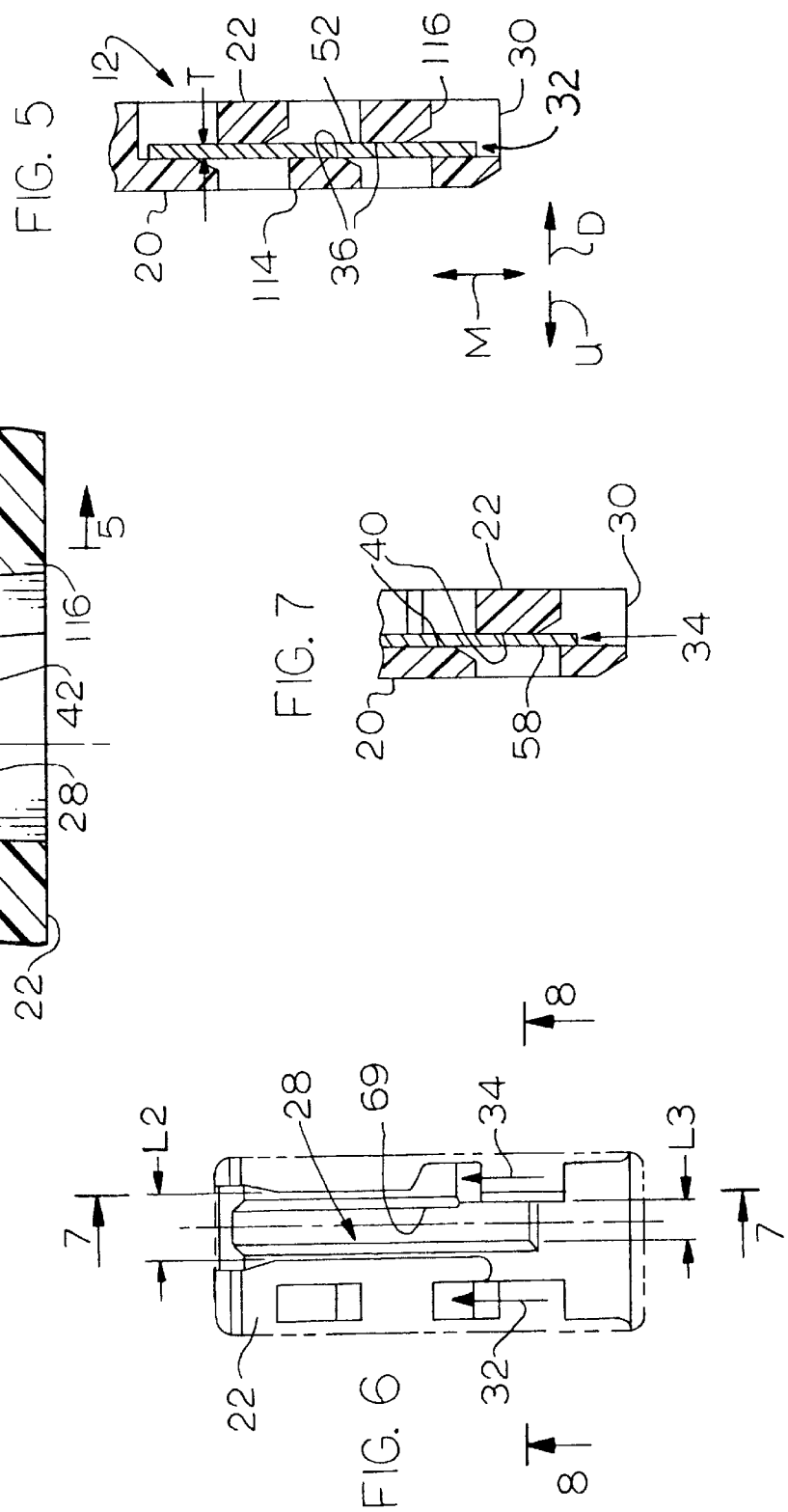

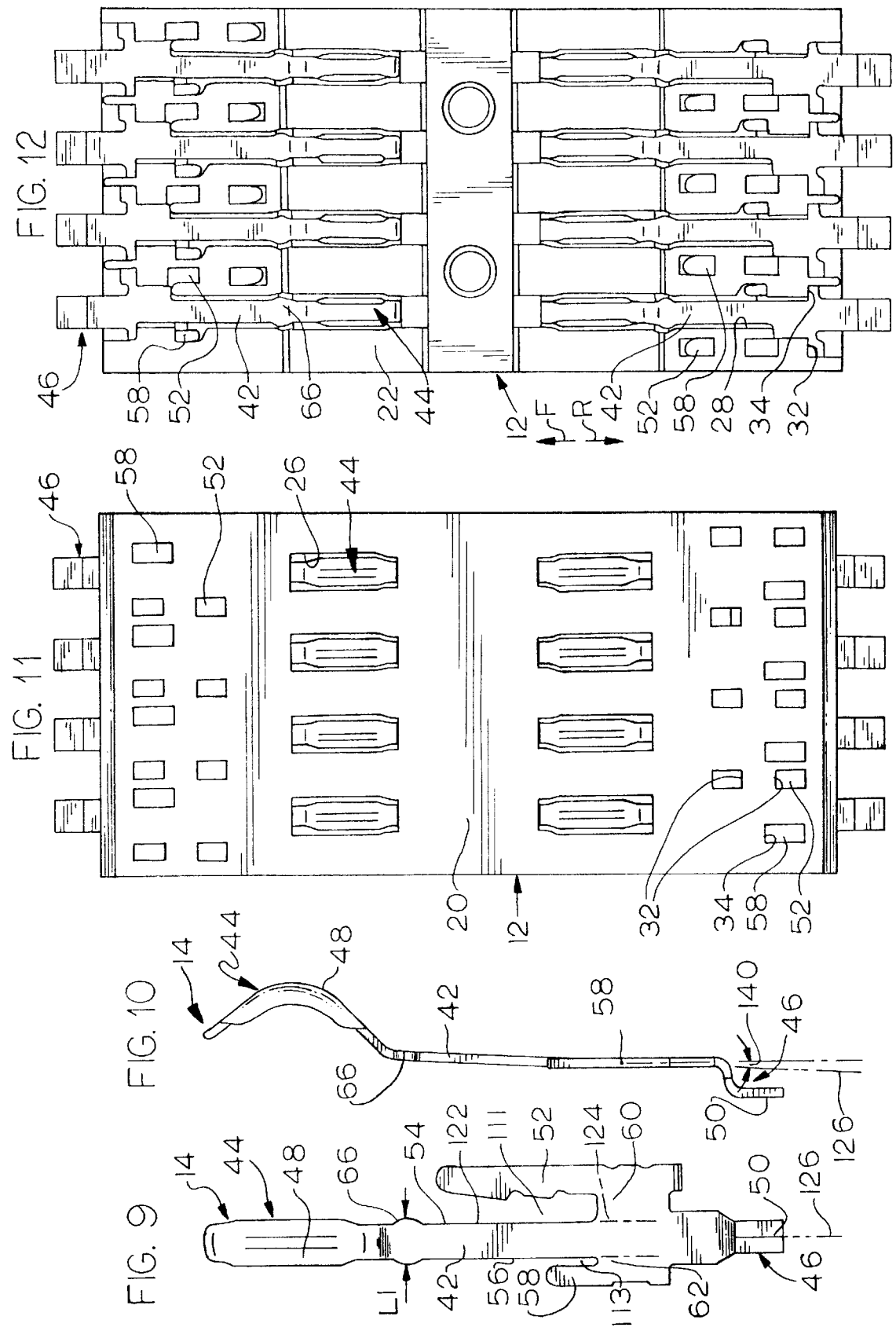

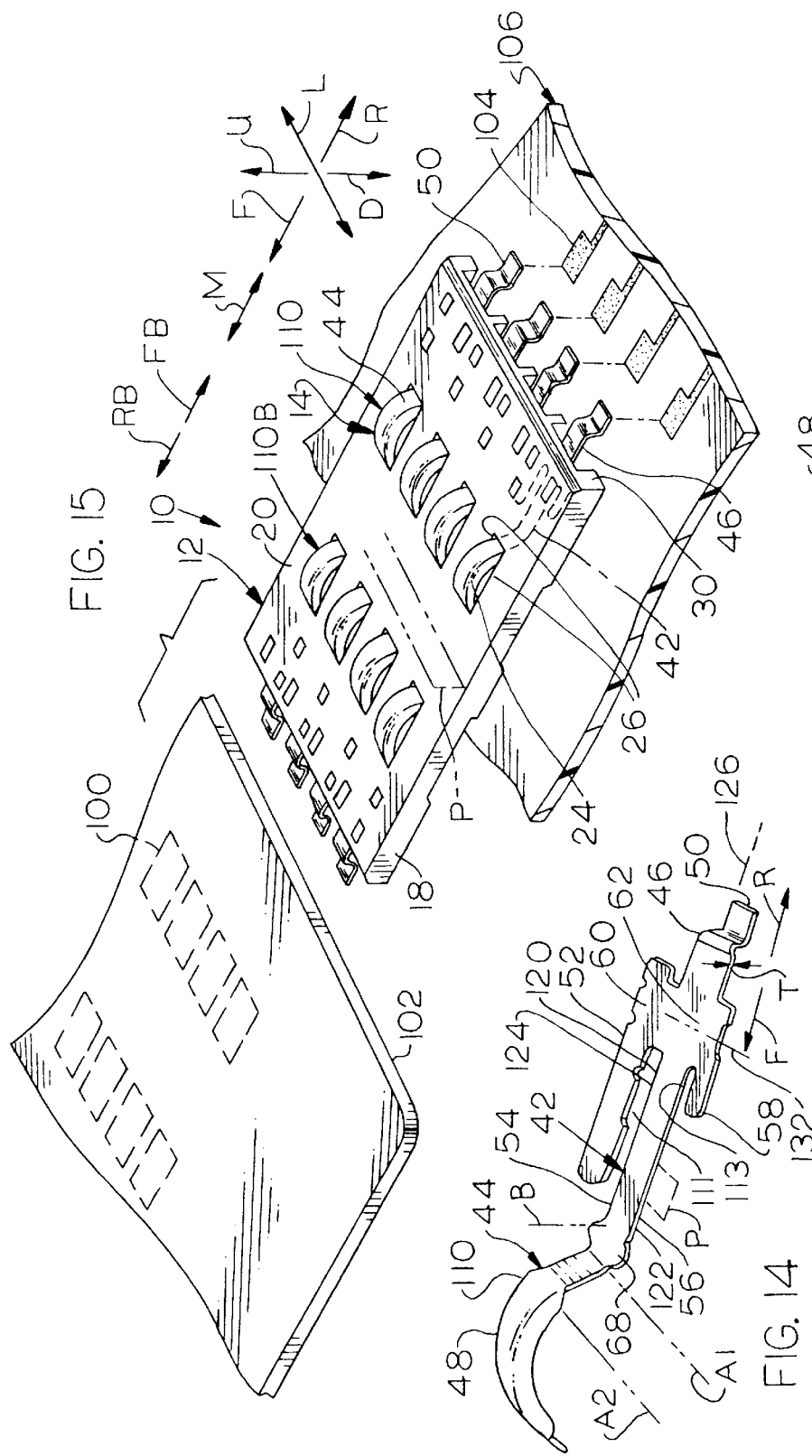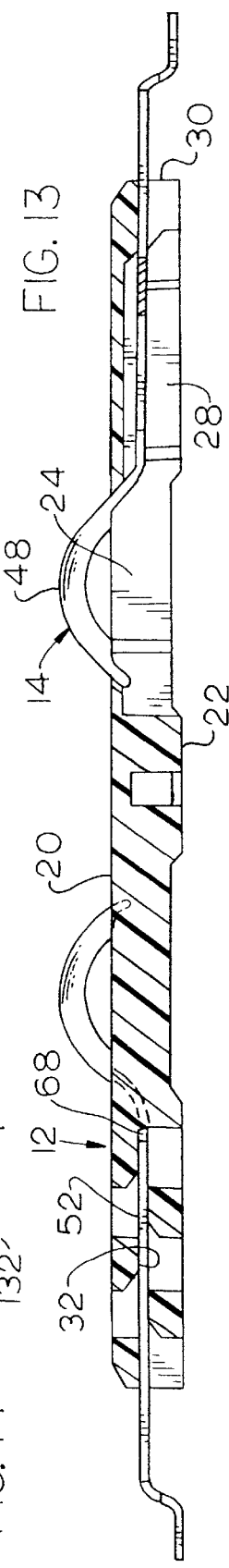

5,882,230

CARD CONNECTOR WITH STABILE CONTACTS

This patent application is a continuation-in-part of PCT/FR96/00589 filed Apr. 18, 1996 published as WO96/33527, Oct. 24, 1996 which named the United States and which claimed priority from French application 95/04783 filed Apr. 21, 1995.

BACKGROUND OF THE INVENTION

The present invention relates to an electrical connector, especially for connecting to a contact-type integrated-circuit card, commonly referred to as an electronic memory card or "smart card". Such card includes, on one of its faces, a plurality of electrical contact pads that are engaged during insertion of a card into a read/write device.

The invention relates more particularly to a connector of the type that includes a molded plastic support having a planar contacting face over which the card slides, and a plurality of electrical contacts. Each contact has a curved front end that projects above the planar face of the support to engage one of the card pads. Each contact also has a central portion for mounting on the support, and has a rear end for connecting to circuitry such as the processing circuit of a read/write device. As described in French patent application number 9315633, the central portion of the contact can have a harpoon-shaped catching foot which lies beside a strip-shaped middle of the central portion, with the catching foot being received in a corresponding slot in the support.

The above design allows connectors to be produced at low cost, because the contacts are securely held and do not have to be molded in place in the support. However, for some applications, especially when the connector does not include a cover for lying over the planar top face of the support, it is found that previous contacts were not securely enough held in place. That is, there was a possibility that they might tilt excessively and move out of their intended location, as a result of insertion of a memory card. A connector which enabled easy mounting of contacts on the support, while providing even more secure holding of the contacts, would be of value.

SUMMARY OF THE INVENTION

In accordance with one embodiment of the present invention, a smart card electrical connector is provided with non-molded-in-place contacts, which are securely mounted on the dielectric support of the connector. Each contact includes a catching foot lying at a first lateral side of the middle of the contact central portion. Each contact also includes a lateral stabilizing foot lying at a second or opposite side of the middle of the central portion. The stabilizing foot lies in a slot with walls extending parallel to the planar top face of the support. The combination of the catching foot and stabilizing foot, minimizes tilting of the contact, especially about its longitudinal axis. This helps stabilize the orientation of the projecting part of the contact, and also helps avoid dislocation of the contact from its properly installed position.

The stabilizing foot extends longitudinally, and is received in a longitudinally-extending slot in the support. The slot has upper and lower surfaces that closely receive the stabilizing foot between them. The catching foot and the stabilizing foot have rear ends that merge with the middle of the central portion at aligned locations, and each extends forwardly therefrom.

The central portion has forward and rearward parts. The forward part lies in a groove that permits downward bending of the central portion as the front portion of the contact is downwardly deflected by a card. The front of the central portion has laterally extending tabs that help locate the front of the central portion. The support has a longitudinally-extending narrow channel at the upper wall of the groove, that can receive the top of the projecting front end of the contact during installation of the contact in the support.

The novel features of the invention are set forth with particularity in the appended claims. The invention will be best understood from the following description when read in conjunction with the accompanying drawings.

BRIEF DESCRIPTION OF THE DRAWINGS

FIG. 1 is a plan view of the support of an electrical connector of the invention, shown without the contacts installed therein.

FIG. 2 is a view taken in the direction of arrow F2 of FIG. 1.

FIG. 3 is a bottom view of the connector support of FIG. 1.

FIG. 4 is a sectional view taken on line 4—4 of FIG. 3.

FIG. 5 is an enlarged view of area A of FIG. 4.

FIG. 6 is an enlarged view of a portion of FIG. 3.

FIG. 7 is a sectional view taken on line 7—7 of FIG. 6.

FIG. 8 is a sectional view taken on line 8—8 of FIG. 6.

FIG. 9 is a plan view of a contact of the invention, which can be mounted on the insulating support of FIGS. 1–8.

FIG. 10 is a side view taken from the left, of the contact of FIG. 9.

FIGS. 11 and 12 are views similar to those of FIGS. 1 and 3, but illustrating the connector with the contacts mounted thereon.

FIG. 13 is an enlarged view of FIG. 4, with contacts mounted on the support.

FIG. 14 is an isometric view of the contact of FIGS. 10 and 11.

FIG. 15 is an exploded isometric view, showing the connector with contacts installed thereon, showing a portion of a circuit board on which the connector can be mounted, and showing a portion of a smart card which can be slid over the connector.

DESCRIPTION OF THE PREFERRED EMBODIMENT

FIG. 15 illustrates a card connector 10 of the present invention, for engaging contact pads 100 that lie on the lower face of a smart card 102. The connector includes a dielectric support 12 having an upper face 20 and having a plurality of contacts 14 with contacting front end portions 44. The card 102 is installed by sliding it in a longitudinal M rearward direction R, into a card receiver which includes the connector, so the lower face of the card lies substantially facewise above the upper face 20 of the connector, and the card pads engage the contacting portions 44 of the contacts. Electrical signals then can pass from the card pads 100, through the contacts 14 and from rear terminal ends 50 of the contacts. The signals pass from the terminal ends through traces 104 on a circuit board 106 to read/write circuitry lying on or connected to the circuit board traces, with signals also possibly passing in the opposite direction.

As shown in FIG. 13, the support 12 is molded of insulative, or dielectric material. The support has a lower or bearing face 22 for resting on the circuit board (or which can be embedded in a housing), which lies opposite the upper face 20. FIG. 15 shows that the support has laterally opposite sides 18 and longitudinally opposite ends 30, and is symmetrical about a vertical plane P that lies halfway between the longitudinally opposite ends. The support has two laterally-extending rows of openings or notches 24 through which parts of the contact front portions project. Each notch has laterally opposite edges 26, with each notch having a lower portion (FIG. 13) that merges with a longitudinally-extending groove 28 that extends to a corresponding rear end 30 of the support.

The contacts (FIG. 15) are arranged in two laterally extending rows 110A and 110B. The following discussion describes the first row 110A whose orientation is shown with respect to the arrows F and R. The other row of contacts 110B is identical but oriented in an opposite direction, with forward and rearward directions for the row 110B indicated by arrows FB and RB, but these contacts are not specifically discussed below.

FIG. 14 shows that each contact 14 is formed from sheet metal by cutting, folding and bending it. Each contact has a central portion 42, a contacting front portion 44 and a rear end 46. The front portion 44 includes a projecting part 110 that is designed to project upwardly through a notch in the support, so a convexly rounded pad-engaging top 48 engages the inserted card. The rear end portion 46 of the contact has about a 90° bend with respect to the horizontal plane of the central part 42 to provide the terminating rear end 50 that can be soldered to a trace on the circuit board.

Each contact 14 includes a harpoon-shaped catching foot 52 which extends primarily longitudinally, that is, primarily parallel to the lateral edges 54, 56 of the central portion 42. The first or catching foot 52 forms projections 114 at one side for locking itself and the entire contact in a slot of the support. In accordance with the present invention, the contact also includes a stabilizing foot 58 lying on a side of a strip-shaped middle section 124 of the center portion opposite the catching foot 52. The first and second feet 52, 58 are joined to the middle section 124 at laterally-extending cross pieces 60, 62. Applicant prefers to form gaps 111, 113 between forward portions of the feet and a rear part 120 of the central portion 42. This leaves a longer front part 122 of the central portion which can be downwardly deflected when the contact top 48 is downwardly deflected by a card. The cross pieces are laterally aligned, that is, they are centered on the same imaginary line 132, to avoid tilt of the front section.

FIG. 14 shows that the strip-shaped contact is formed of sheet metal that originally lay in a plane P and had a predetermined thickness T. The contact has bends such as about axes A1 and A2 that lie in the plane P or extend parallel thereto, but does not have any axes that extend normal to the plane (i.e. parallel to line B).

FIG. 12 shows that the catching and stabilizing feet 52, 58 lie in slots 32, 34 of the support, on opposite sides of the groove 28 that receives the center portion 42. FIG. 11 is a plan view of the connector, showing that the positions of the slots 32, 34 appear reversed when viewed from above.

As shown in FIG. 8, each of the slots 32, 34 has upper and lower walls that trap the corresponding foot 52, 58 in place. A view taken on line 5—5 is illustrated in FIG. 5, and shows that the catch slot 32 has upper and lower walls 36 that closely surround the catching foot 52. The upper and lower walls are formed by a plurality of longitudinally-spaced vertical projections, including upward projections 114 that project upwardly from the slot 32, and lower projections 116 that project downwardly from the slot. The upward and downward projections 114, 116 are staggered in a longitudinal direction M along the slot. This allows the catching foot 52 to be securely held in the slot, even though the distance between the upper and lower slot walls 36 may be slightly less than the thickness T of the foot. The foot can merely extend in a wave. The provision of staggered projections 114, 116 also helps in molding the supporting 12. FIG. 7 shows that the stabilizing slot 34 is similarly constructed with staggered projections to closely hold the stabilizing foot 58.

FIG. 8 shows that the groove 28 in which the central portion 42 of the contact extends, has an upper wall 130 forming a channel 69 that lies above the slots 32, 34 and above the position of the center portion 42 when it is fully installed. The channel 69 is provided to help in installation of the contact. During forward sliding of the contact into position, the projecting part 110 of the contact slides along the channel 69, which allows the top at 48A to lie relatively high, so there is less downward bending of the center portion 42. The top 48 is curved about a longitudinal axis 136, so the top is narrow. Applicant prefers to fix the height of the front end of the center portion, and to do this provides a widened portion 68 (FIG. 14) formed by a pair of laterally-projecting tabs 66 at the front end of the center portion which is wider than the channel 69. This widened front end at 68 can lie on locations 67 (FIG. 8) to fix its maximum height. Of course, the widened portion 68 will deflect downwardly when the top 48 of the contact projecting portion is downwardly deflected by a card. The groove 28 extends to the lower face 22 of the support to permit large downward deflection of the center portion 42. FIG. 6 shows the width L3 of the channel and the width L2 of the groove 28, while FIG. 9 shows the width L1 of the contact widened portion 66. L1 is less than L2 but greater than L3.

As shown in FIG. 9, each of the feet 52, 58 extends longtidudinally further than the cross pieces 60, 62 that connect the feet to a strip-shaped middle section 124 of the center portion 42. This results in a longer deflectable front part 122 of the center portion, which facilitates bending of the contact during downward depression by a card.

The provision of the two feet 52, 58 on opposite sides of the middle section 124, results in more stable positioning of the contact 14. Sometimes, a side of a card or other object presses laterally against the projecting portion of the contact, which tends to tilt the contact about its longitudinal axis 126. The feet resist such tilt. The feet also assure proper initial orientation of the contact about the longitudinal axis. FIG. 10 shows that the feet, such as 58, are bent by an angle 140 of a plurality of degrees from the center portion 42 to urge the widened part 68 and the contacting front end portion upwardly.

While terms such as "top", "bottom", etc. have been used to help describe the invention, it should be understood that the connector can be used in any orientation with respect to the Earth.

Thus, the invention provides an electrical card connector of the type that has a molded dielectric support and a plurality of contacts that can be installed by sliding them into place, which assures secure positioning of each contact while permitting resilient deflection of the front portion of the contact, using contacts of small dimensions. Each contact has a center portion with a strip-shaped middle section and with a pair of feet projecting in laterally opposite directions from the middle section. The lateral feet are closely received in slots of the support, to fix the orientation of the contact about a longitudinal axis. Each slot is preferably formed by staggered projections alternately extending upwardly and downwardly from the slot, to enable very close holding of each foot. Each foot is preferably elongated in a longitudinal direction, but only its rear portion is connected to the middle of the contact center portion, to provide a longer bendable front part of the center portion of the contact. Each contact center portion lies in a longitudinally-extending groove, with the top wall of the groove preferably having a channel, along which the top of the projecting part of the contact can slide during contact installation.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical card connector comprising:

a support (12) molded of insulating material and having an upper wall (130) with an upper face (20), and a plurality of largely strip-shaped sheet metal contacts (14) with each contact being elongated and extending in a longitudinal direction (M);

each of said contacts having a contacting front end portion (44) with a pad-engaging part (110) projecting upwardly above the support upper face, a longitudinally elongated central portion (42) for mounting the contact (14) to the support (12) with the central portion having laterally spaced first and second sides, and a termination rear end (46) for connecting the contact to processing circuitry;

said support having a groove (28) and a pair of slots (32, 34) on laterally opposite sides of said groove;

said central portion (42) of each contact (14) includes a strip-shaped middle section (124) lying in said groove, and a catching foot (52) lying on a first lateral side of said middle section for fixing the contact (14) to the support (12), and with said catching foot received in a first (32) of said slots;

each contact blade (14) includes a lateral stabilizing foot (58) which lies on a second lateral side of said middle section and which is trapped in a second (34) of said slots;

each of said largely strip-shaped sheet metal contacts is formed of a sheet of metal that originally lay in a plane (P) and had a predetermined thickness (T), and each largely strip-shaped sheet metal contacts has bends about axes (A1, A2) that extend parallel to the plane (P) of said sheet and is devoid of bends about axes (B) that are normal to said sheet, with an average width of gaps (111, 113) between said middle section and each of said feet (52, 58) being no more than an average width of said middle section (124).

2. The electrical connector described in claim 1 wherein:

said catching foot (52) and said stabilizing foot (58) are each joined to a corresponding one of said lateral sides of said middle section by a cross-piece (60, 62) of smaller longitudinal length than said feet, with said cross-pieces (60, 62) being aligned in a lateral direction and each being longer in said longitudinal direction (M) than its width in said lateral direction (L).

3. The connector described in claim 1 wherein:

said support has longitudinally-spaced vertical projections (114, 116) forming top and bottom walls of a first of said slots, said vertical projections including upward projections projecting upwardly from said top wall and downward projections projecting downwardly from said bottom wall, with said upward and downward projections being staggered in a longitudinal direction along said first slot.

4. The electrical connector described in claim 1, wherein:

said groove (28) has an upper end forming a channel (69) which is wide enough to receive the pad-engaging part (110) of said front end portion during forward insertion of the contact into said support.

5. The electrical connector described in claim 4, wherein:

said contact central portion (42) has a widened front end (68) whose transverse width (L1) is greater than the width (L3) of said channel but that is less than the width (L2) of the groove (28).

* * * * *